United States Patent
Liu et al.

(10) Patent No.: US 12,202,346 B2
(45) Date of Patent: Jan. 21, 2025

(54) PROJECTION ASSEMBLY, DISPLAY SYSTEM AND VEHICLE

(71) Applicants: Beijing BOE Display Technology Co., Ltd., Beijing (CN); BOE Technology Group Co., Ltd., Beijing (CN)

(72) Inventors: Yuhong Liu, Beijing (CN); Chenru Wang, Beijing (CN); Yulong Wu, Beijing (CN); Lili Chen, Beijing (CN); Feng Zi, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/788,123

(22) PCT Filed: Sep. 2, 2021

(86) PCT No.: PCT/CN2021/116253
§ 371 (c)(1),
(2) Date: Jun. 22, 2022

(87) PCT Pub. No.: WO2023/028953
PCT Pub. Date: Mar. 9, 2023

(65) Prior Publication Data
US 2024/0166049 A1   May 23, 2024

(51) Int. Cl.
*G03B 21/14* (2006.01)
*B60K 35/23* (2024.01)
(Continued)

(52) U.S. Cl.
CPC .......... *B60K 35/231* (2024.01); *G03B 21/145* (2013.01); *G03B 21/16* (2013.01);
(Continued)

(58) Field of Classification Search
CPC ...... G03B 21/16; G03B 21/145; G03B 21/40; G02B 27/01; B60K 35/00; B60K 35/23; H04N 9/3173
See application file for complete search history.

(56) References Cited

U.S. PATENT DOCUMENTS

2018/0348612 A1* 12/2018 Nakajima ............. G03B 21/16
2019/0129172 A1   5/2019 Misawa et al.
2020/0186763 A1   6/2020 Chen et al.

FOREIGN PATENT DOCUMENTS

CN    106740545 A    5/2017
CN    208198111 U    12/2018
(Continued)

*Primary Examiner* — Ryan D Howard
(74) *Attorney, Agent, or Firm* — IPro, PLLC (57) ABSTRACT

Provided are a projection assembly, a display system and a vehicle. The projection assembly is applied to the vehicle, and the projection assembly includes: a housing, a bottom cover, a display module, a heat dissipation assembly and an imaging lens. The housing is connected with the bottom cover, and the housing and the bottom cover form an accommodating space, the heat dissipation assembly, the display module and the imaging lens are all disposed in the accommodating space, and the display module is disposed on the heat dissipation assembly; and the imaging lens includes a lens barrel and a lens assembly, the lens barrel is disposed on the heat dissipation assembly, the lens assembly is disposed in the lens barrel, and the lens barrel surrounds the display module, the display module faces the lens assembly, the housing is provided with an opening, and the lens assembly faces the opening.

20 Claims, 6 Drawing Sheets

(51) Int. Cl.
*B60K 35/231* (2024.01)
*G03B 21/16* (2006.01)
*G03B 21/54* (2006.01)

(52) U.S. Cl.
CPC ........ *G03B 21/54* (2013.01); *B60K 2360/583* (2024.01); *B60Y 2410/113* (2013.01)

(56) References Cited

FOREIGN PATENT DOCUMENTS

| | | |
|---|---|---|
| CN | 208902983 U | 5/2019 |
| CN | 209297091 U | 8/2019 |
| CN | 111290203 A | 6/2020 |
| CN | 212675277 U | 3/2021 |
| CN | 214041981 U | 8/2021 |
| JP | 2016075760 A | 5/2016 |

\* cited by examiner

PROJECTION ASSEMBLY, DISPLAY SYSTEM AND VEHICLE

TECHNICAL FIELD

The present disclosure relates to a technical field of vehicles, and more particularly, to a projection assembly, a display system and a vehicle.

BACKGROUND

With development of technology, vehicles are increasingly and widely used, for example, cars and airplanes are widely used. A Head Up Display (HUD), also known as a head-up display system, is installed in vehicles, which can project important information on a holographic half-mirror on a windshield, or on a display screen, so that drivers do not have to look down to view the important information clearly. In the related art, the head-up display system includes a projection assembly, but the projection assembly dissipates heat during use, which affects use of the projection assembly.

SUMMARY

A projection assembly and a vehicle are provided in embodiments of the present disclosure, so as to solve a problem that a projection assembly in the related art dissipates heat during use, which affects use of the projection assembly.

In order to solve the foregoing technical problem, the present disclosure is realized as follows.

In a first aspect, a projection assembly applied to a vehicle is provided in an embodiment of the present disclosure. The projection assembly includes: a housing, a bottom cover, a display module, a heat dissipation assembly and an imaging lens.

The housing is connected with the bottom cover, and the housing and the bottom cover form an accommodating space. The heat dissipation assembly, the display module and the imaging lens are all disposed in the accommodating space, and the display module is disposed on the heat dissipation assembly.

The imaging lens includes a lens barrel and a lens assembly. The lens barrel is disposed on the heat dissipation assembly, the lens assembly is disposed in the lens barrel, and the lens barrel surrounds the display module, the display module faces the lens assembly, the housing is provided with an opening, and the lens assembly faces the opening.

Optionally, the bottom cover is provided with a plurality of first air holes, and the heat dissipation assembly includes a heat conducting block and a plurality of heat dissipation fins.

The heat conducting block includes a first face and a second face which are opposite to each other. The second face faces the plurality of first air holes on the bottom cover, the display module is disposed on the first face, and the plurality of heat dissipation fins are disposed on the second face.

Optionally, the heat dissipation assembly further includes a heat dissipation fan, the housing is provided with a plurality of second air holes, and the plurality of second air holes all face the heat dissipation fins.

The heat dissipation fan is disposed on the second face, the plurality of heat dissipation fins surround the heat dissipation fan, and the heat dissipation fan faces the bottom cover, so that an air flow generated by the heat dissipation fan circulates through the first air holes or the second air holes.

Optionally, the projection assembly further includes a control circuit.

The control circuit is disposed in the accommodating space, and the display module is electrically connected with the control circuit, and the control circuit is configured for controlling the display module to display.

In a second aspect, a display system is provided in an embodiment of the present disclosure. The display system includes a display screen and any one of the projection assemblies described in the first aspect above.

The lens assembly faces the display screen.

In a third aspect, a vehicle is provided in an embodiment of the present disclosure. The vehicle includes the display system in the second aspect above.

In the embodiments of the present disclosure, as the housing is connected with the bottom cover and the housing and the bottom cover form the accommodating space, the heat dissipation assembly, the display module and the imaging lens may be disposed in the accommodating space. Because the display module is disposed on the heat dissipation assembly and the imaging lens includes the lens barrel and the lens assembly, with the lens barrel being disposed on the heat dissipation assembly, a lens being disposed in the lens barrel, the lens barrel surrounding the display module, and the display module facing the lens assembly, light emitted by the display module can pass through and image through the lens assembly and heat dissipated by the display module can be dissipated through the heat dissipation assembly, when the display module displays an image. As the housing is provided with the opening and the lens assembly faces the opening, when the lens assembly is imaging, the light emitted by the display module can pass through the lens assembly and then penetrates out from the opening of the housing, so that the lens assembly can image outside the housing; and when the projection assembly is applied to a vehicle, the light emitted by the display module passes through the lens assembly and then can display on a to-be-displayed device in the vehicle, so that a driver can see the image displayed by the display module on the to-be-displayed device. That is, in the embodiments of the present disclosure, by arranging the heat dissipation assembly, the display module and the imaging lens in the accommodating space formed by the housing and the bottom cover, when the display module displays an image, the image can be displayed through the imaging lens, and then transmitted to outside of the housing through the opening in the housing; moreover, heat dissipation can be made by the heat dissipation assembly on the projection module, so that heat generated by the projection assembly can be dissipated by the heat dissipation assembly during an imaging and projection process of the projection assembly, with a better projection effect of the projection assembly.

BRIEF DESCRIPTION OF THE DRAWINGS

In order to more clearly illustrate technical solutions of embodiments of the present disclosure or the prior art, drawings that are required to describe the embodiments or the prior art will be briefly introduced below. Apparently, the drawings described below are embodiments of the present disclosure, and a person skilled in the art can obtain other drawings according to these drawings without paying creative effort.

REFERENCE NUMERALS

10: housing; 20: bottom cover; 30: display module; 40: heat dissipation assembly; 50: imaging lens; 60: control circuit; 70: fixing piece; 80: interface assembly; 90: rotary regulating assembly; 100: mounting bracket; 110: restrained support; 120: display screen; 11: second air hole; 21: first air hole; 41: heat conducting block; 42: heat dissipation fin; 43: heat dissipation fan; 51: lens barrel; 52: lens assembly; 91: mounting shell; 92: movable connecting piece; 93: fastening adjusting piece; 911: movable part; and 912: connecting part.

DETAILED DESCRIPTION OF THE EMBODIMENTS

Technical solutions in embodiments of the present disclosure will be clearly and completely described below with reference to the drawings of the embodiments of the present disclosure. Apparently, the described embodiments are merely some of the embodiments of the present disclosure, rather than all of them. Based on the embodiments of the present disclosure, all other embodiments obtained by those of ordinary skills in the art without going through any creative effort shall fall within the scope of protection of the present disclosure.

It should be appreciated that any reference in this specification to "one embodiment" or "an embodiment" means that particular features, structures, or characteristics described in connection with the embodiment are included in at least one embodiment of the present disclosure. Therefore, expression of "in one embodiment" or "in an embodiment" appearing throughout this specification may not necessarily refer to a same embodiment. Furthermore, these specific features, structures, or characteristics may be arbitrarily combined in any suitable manner in one or more embodiments.

As shown in FIG. 1 to FIG. 10, a projection assembly includes: a housing 10, a bottom cover 20, a display module 30, a heat dissipation assembly 40 and an imaging lens 50.

The housing 10 is connected with the bottom cover 20, and the housing 10 and the bottom cover 20 form an accommodating space, the heat dissipation assembly 40, the display module 30 and the imaging lens 50 are all disposed in the accommodating space, and the display module 30 is disposed on the heat dissipation assembly 40. The imaging lens 50 includes a lens barrel 51 and a lens assembly 52, the lens barrel 51 is disposed on the heat dissipation assembly 40, the lens assembly 52 is disposed in the lens barrel 51, and the lens barrel 51 surrounds the display module 30, the display module 30 faces the lens assembly 52, the housing 10 is provided with an opening, and the lens assembly 52 faces the opening.

In the embodiment of the present disclosure, as the housing 10 is connected with the bottom cover 20 and the housing 10 and the bottom cover 20 form the accommodating space, the heat dissipation assembly 40, the display module 30 and the imaging lens 50 may be disposed in the accommodating space. Because the display module 30 is disposed on the heat dissipation assembly 40, and the imaging lens 50 includes the lens barrel 51 and the lens assembly 52, the lens barrel 51 is disposed on the heat dissipation assembly 40, a lens is disposed in the lens barrel 51, the lens barrel 51 surrounds the display module 30, and the display module 30 faces the lens assembly 52, light emitted by the display module 30 can pass through the lens assembly 52 for imaging through the lens assembly 52 and heat dissipated by the display module 30 can be dissipated through the heat dissipation assembly 40 when the display module 30 displays an image. As the housing 10 is provided with the opening and the lens assembly 52 faces the opening, when the lens assembly 52 is imaging, the light emitted by the display module 30 can pass through the lens assembly 52 and then penetrates out from the opening of the housing 10, so that the lens assembly 52 can image outside the housing 10; and when the projection assembly is applied to a vehicle, the light emitted by the display module 30 passes through the lens assembly 52 and then can display on a to-be-displayed device in the vehicle, so that a driver can see the image displayed by the display module 30 on the to-be-displayed device. That is, in the embodiment of the present disclosure, by arranging the heat dissipation assembly 40, the display module 30 and the imaging lens 50 in the accommodating space formed by the housing 10 and the bottom cover 20, when the display module 30 displays an image, the image can be displayed through the imaging lens 50, and then transmitted to outside of the housing 10 through the opening in the housing 10; moreover, heat dissipation can be made by the heat dissipation assembly 40 on the projection module 30, so that heat generated by the projection assembly can be dissipated by the heat dissipation assembly 40 during an imaging and projection process of the projection assembly, with a better projection effect of the projection assembly.

It should be noted that in the embodiment of the present disclosure, the lens assembly 52 may include at least one lens, for example, the lens assembly 52 includes two lenses. In a case that the lens assembly 52 includes a plurality of lenses, the plurality of lenses may be convex lenses or concave lenses, a specific arrangement of which may be set according to actual needs, which is not limited here in the embodiment of the present disclosure.

In addition, in the embodiment of the present disclosure, the lens barrel 51 may include a plurality of sub-barrels which are sleeved with each other. For example, the lens barrel 51 includes two sub-barrels which are sleeved with each other, that is, one sub-barrel is sleeved on the other sub-barrel and the two sub-barrels are bonded by adhesive 001. In a case that the lens barrel 51 includes two sub-barrels which are sleeved with each other, an inner sub-barrel of the lens barrel 51 can be made of plastic, and an outer sub-barrel of the lens barrel 51 can be made of metal or plastic. In a case that the inner sub-barrel of the lens barrel 51 is made of plastic, the sub-barrel may surround the display module 30 and function to protect the display module 30; and additionally, it is also convenient to process the outer sub-barrel of the lens barrel 51. Certainly, the lens barrel 51 may also include other numbers of sub-barrels. For example, the lens barrel 51 includes three sub-barrels, which are sleeved with each other. A number of sub-barrels included in the lens barrel 51 is not limited here in the embodiment of the present disclosure.

In addition, in the embodiment of the present disclosure, a diameter of the lens barrel 51 may be made large, that is, the lens barrel 51 may have a larger space at the display module 30, so as to prevent the light emitted by the display module 30 from irradiating an inner wall of the lens barrel 51 with the lens barrel 51 surrounding the display module 30, thereby affecting imaging effect of the display module 30 through the lens assembly 52.

Figure 3:
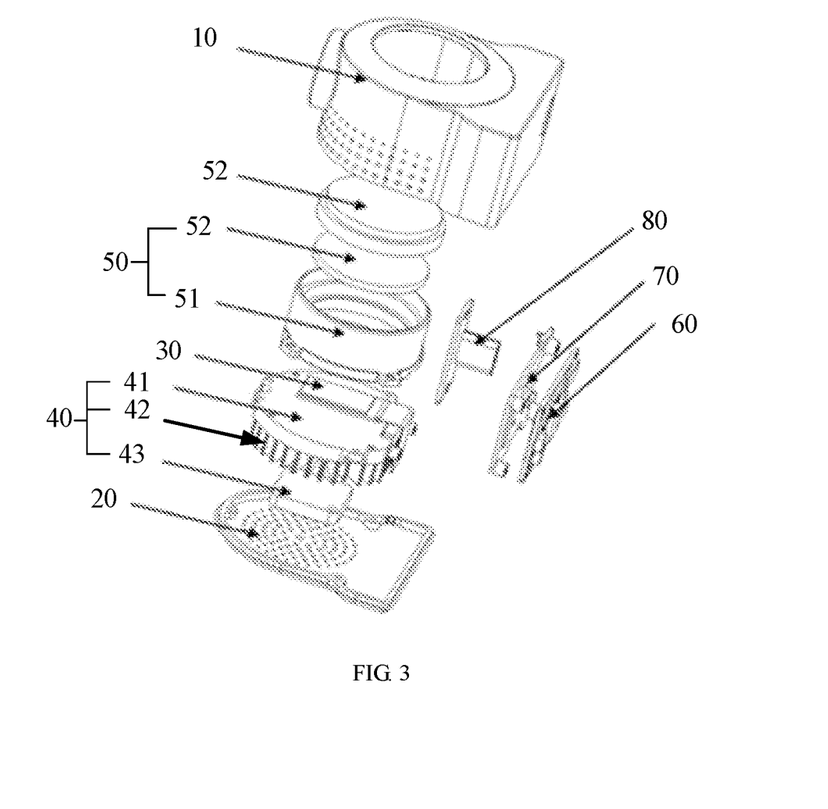
FIG. 3 shows yet another imaging schematic diagram of a projection assembly provided by the embodiment of the present disclosure.
Figure 10:
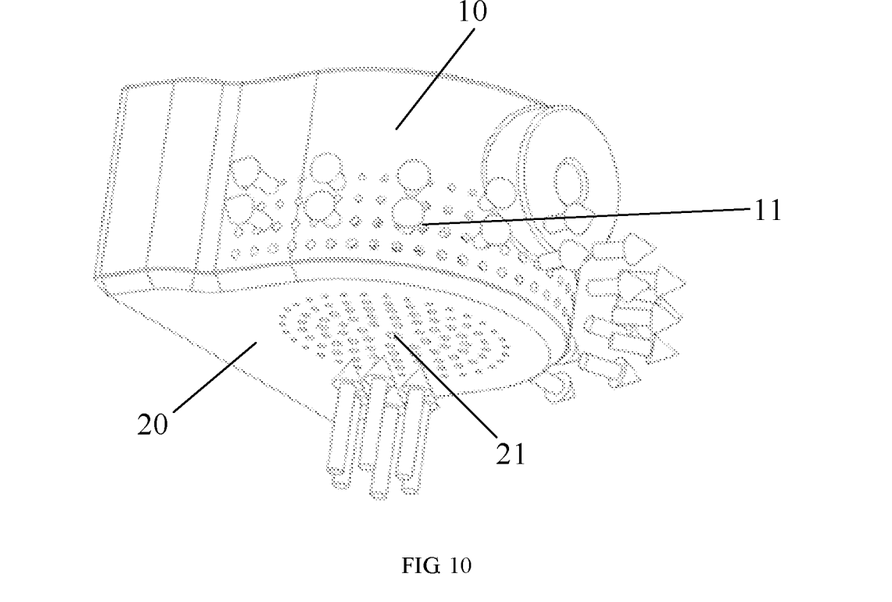
FIG. 10 shows a schematic diagram of an air flow for heat dissipation provided by an embodiment of the present disclosure.

Moreover, in some embodiments, as shown in FIG. 3 and FIG. 10, the bottom cover 20 may be provided with a plurality of first air holes 21, and the heat dissipation assembly 40 may include a heat conducting block 41 and a plurality of heat dissipation fins 42. The heat conducting block 41 includes a first face and a second face which are opposite to each other, the second face faces the plurality of first air holes 21 on the bottom cover 20, the display module 30 is disposed on the first face, and the plurality of heat dissipation fins 42 are disposed on the second face.

As the heat dissipation assembly 40 includes the heat conducting block 41 and the plurality of heat dissipation fins 42, the display module 30 is disposed on the first face of the heat conducting block 41 and the plurality of heat dissipation fins 42 are disposed on the second face of the heat conducting block 41, the heat conducting block 41 can conduct the heat dissipated by the display module 30 to the plurality of heat dissipation fins 42 when the display module 30 dissipates heat. Since the bottom cover 20 is provided with the plurality of first air holes 21 and the second face faces the plurality of first air holes 21 on the bottom cover 20, that is, the plurality of heat dissipation fins 42 face the plurality of first air holes 21, the plurality of heat dissipation fins 42 can conduct the heat outside of the housing 10 through the plurality of first air holes 21 when the heat conducting block 41 conducts heat to the plurality of heat dissipation fins 42, so that the heat generated by the display module 30 can be transferred to outside of the housing 10.

It should be noted that, in the embodiment of the present disclosure, a material of the heat conducting block 41 may be a material that easily conducts heat, for example, the material of the heat conducting block 41 may be aluminum, and the material of the heat conducting block 41 may also be copper. The material of the heat conducting block 41 is not limited here in the embodiment of the present disclosure.

In addition, in the embodiment of the present disclosure, shapes of the heat dissipation fins 42 may be set according to actual needs, for example, the heat dissipation fins 42 may be rectangular or wavy in shape. Specific shapes of the heat dissipation fins 42 are not limited here in the embodiment of the present disclosure. In addition, in the embodiment of the present disclosure, materials of the heat dissipation fins 42 may be materials that are easy to dissipate heat, for example, the materials of the heat dissipation fin 42 may be copper, and may also be silver. The materials of the heat dissipation fins 42 are not limited in the embodiment of the present disclosure.

Moreover, in some embodiments, as shown in FIG. 3, the heat dissipation assembly 40 may also include a heat dissipation fan 43, the housing 10 is provided with a plurality of second air holes 11, and the plurality of second air holes 11 all face the fins. The heat dissipation fan 43 is disposed at the second face, and the plurality of heat dissipation fins 42 surround the heat dissipation fan 43, and the heat dissipation fan 43 faces the bottom cover 20, so that an air flow generated by the heat dissipation fan 43 circulates through the first air holes 21 or the second air holes 11.

When the heat dissipation assembly 40 includes the heat dissipation fan 43 and the heat dissipation fan 43 is disposed at the second face, and the plurality of heat dissipation fins 42 surround the heat dissipation fan 43, the heat dissipation fan 43 can rotate to generate an air flow when the heat conducting block 41 conducts the heat dissipated by the display module 30 to the plurality of heat dissipation fins 42. Since the housing 10 is provided with the plurality of second air holes 11, the plurality of second air holes 11 face the heat dissipation fins 42, and the heat dissipation fan 43 faces the bottom cover 20, that is, the heat dissipation fan 43 faces the plurality of first air holes 21, air outside the housing 10 can enter the housing 10 through the first air holes 21 or the second air holes 11, that is enter the accommodating space, when the heat dissipation fan rotates, so that the heat dissipation fan 43 can generate an air flow. The air flow circulates through the second air holes 11 or the first air holes 21, that is, flows outside of the housing 10 through the second air holes 11 or the first air holes 21, thereby transferring the heat generated by the display module 30 outside of the housing 10. That is, by arranging the heat dissipation fan 43, an air flow for heat dissipation can be generated in the accommodating space to improve heat dissipation efficiency of the display module 30.

It should be noted that, in the embodiment of the present disclosure, the heat dissipation fan 43 may be an axial fan, or certainly, may also be a radial fan. In a case that the heat dissipation fan 43 is the axial fan, the first air holes 21 on the housing 10 are equivalent to air inlet holes, and the second air holes 11 on the bottom cover 20 are equivalent to heat dissipation holes. During rotating of the heat dissipation fan 43, the air flow enters the accommodating space from the first air holes 21, and then is discharged from the second air holes 11, thus forming the air flow for heat dissipation to take the heat dissipated by the display module 30 out of the housing 10. In a case that the heat dissipation fan 43 is the radial fan, the first air holes 11 on the housing 10 are equivalent to heat dissipation holes, and the second air holes 11 on the bottom cover 20 are equivalent to air inlet holes. During the rotating of the heat dissipation fan 43, the air flow enters the accommodating space from the second air holes 21, and then is discharged from the first air holes 11, thus forming the air flow for heat dissipation to take the heat dissipated by the display module 30 out of the housing 10. A specific type of the heat dissipation fan 43 is not limited here in the embodiment of the present disclosure.

Moreover, in some embodiments, as shown in FIG. 3, the projection assembly may also include a control circuit 60. The control circuit 60 is disposed in the accommodating space, and the display module 30 is electrically connected with the control circuit 60, and the control circuit 60 is configured for controlling the display module 30 to display.

In a case that the projection assembly includes the control circuit 60 and the display module 30 is electrically connected with the control circuit 60, the control circuit 60 may send a control signal to the display module 30, so that the display module 30 can display based on the control signal. That is, with the control circuit 60 being provided, it is convenient to control the display of the display module 30.

It should be noted that the control circuit 60 may be integrated on a Printed Circuit Board (PCB), or certainly, may also be integrated on a Flexible Printed Circuit board (FPC), which is not limited here in the embodiment of the present disclosure.

In addition, in a case that the projection assembly includes the heat dissipation fan 43, the heat dissipation fan 43 may be electrically connected with the control circuit 60, so that the control circuit 60 can also control the heat dissipation fan 43. Moreover, in the embodiment of the present disclosure, when the control circuit 60 is integrated on the printed circuit board, a battery may also be provided on the printed circuit board, and the battery is connected with the heat dissipation fan 43 to supply power to the heat dissipation fan 43.

Moreover, in some embodiments, as shown in FIG. 3, the projection assembly may also include a fixing piece 70. The fixing piece 70 is disposed in the accommodating space, the control circuit 60 is connected with the fixing piece 70, and the fixing piece is configured for fixing the control circuit 60.

In a case that the projection assembly includes the fixing piece 70 and the control circuit 60 is connected with the fixing piece 70, the fixing piece 70 can fix the control circuit 60 in the accommodating space, that is, the fixing piece 70 fixes a position of the control circuit 60 in the accommodating space, thus avoiding a problem that the control circuit 60 shakes in the accommodating space.

When the control circuit 60 is integrated on the printed circuit board, the printed circuit board is connected with the fixing piece 70, and the fixing piece 70 fixes the printed circuit board in the accommodating space.

It should be noted that the fixing piece 70 may be fixedly connected with an inner wall of the housing 10, so that a position of the fixing member 70 in the accommodating space, and thus the position of the control circuit 60 in the accommodating space, is fixed. In addition, a material of the fixing member 70 may be plastic or metal, which is not limited here in the embodiment of the present disclosure.

Moreover, in some embodiments, as shown in FIG. 3, the projection assembly may also include an interface assembly 80. The housing 10 is provided with a through hole, the interface assembly 80 is partially located in the accommodating space, and the interface assembly is partially located in the through hole, and the interface assembly 80 is electrically connected with the control circuit 60.

In a case that the projection assembly includes the interface assembly 80, and the interface assembly 80 is electrically connected with the control circuit 60, data can be transmitted to the control circuit 60 through the interface assembly 80, or power can be supplied to the control circuit 60 through the interface assembly 80, thus facilitating use of the projection assembly. That is, with the interface assembly 80 be provided, it is possible to facilitate the use of the projection assembly.

It should be noted that the interface assembly 80 may be a Type-C interface, or certainly, may also be other types of interfaces, which is not limited here in the embodiment of the present disclosure. In addition, in the embodiment of the present disclosure, the interface assembly 80 may be electrically connected with the control circuit 60 through a connecting wire.

Figure 1:
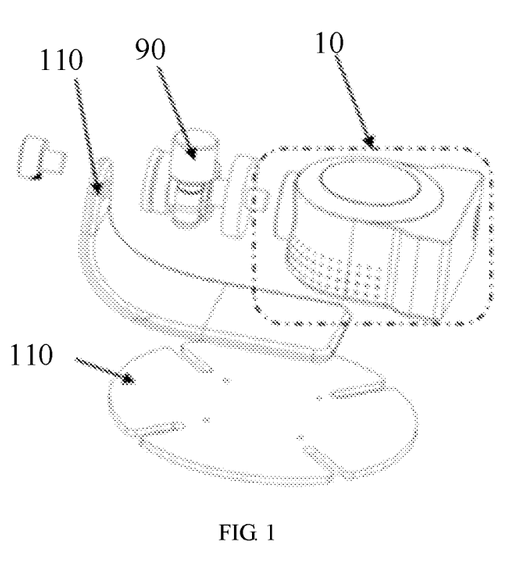
FIG. 1 shows an imaging schematic diagram of a projection assembly provided by an embodiment of the present disclosure.
Figure 2:
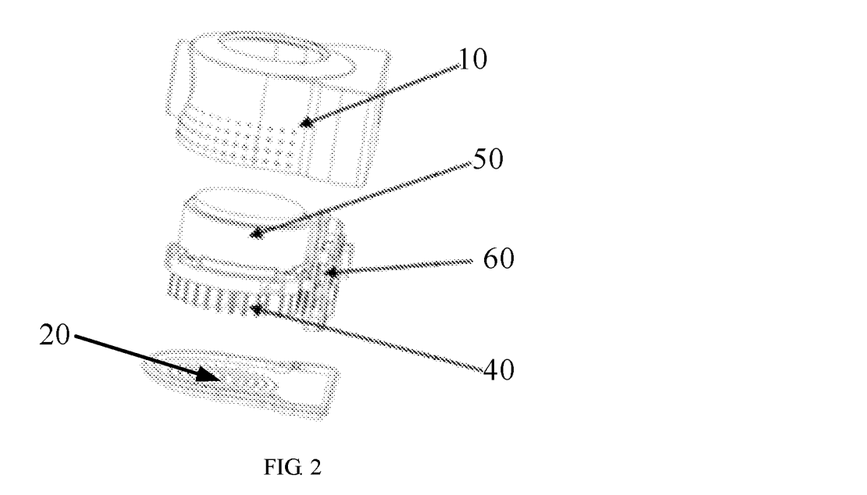
FIG. 2 shows another imaging schematic diagram of a projection assembly provided by the embodiment of the present disclosure.
Figure 4:
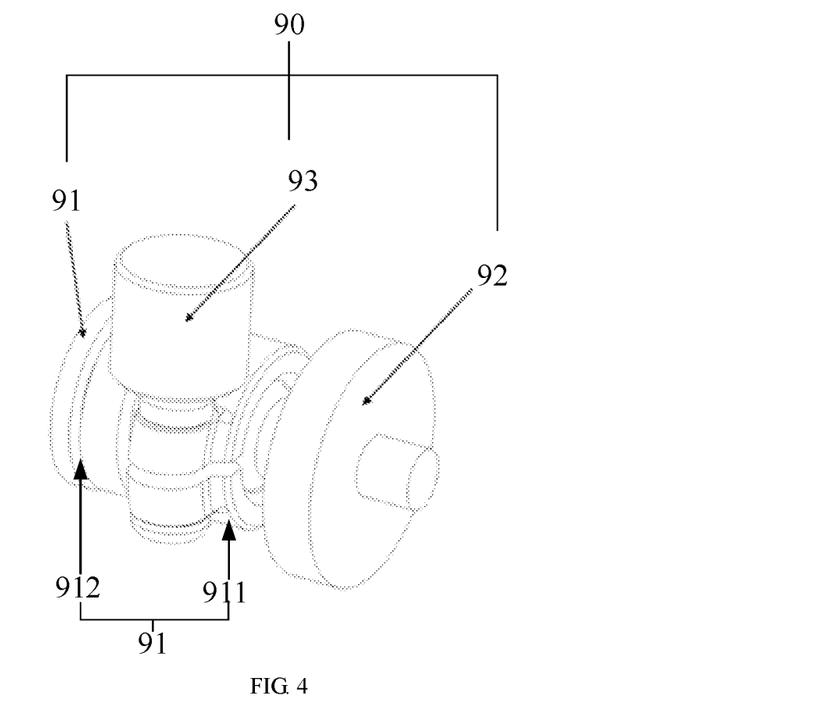
FIG. 4 shows a schematic diagram of a rotary regulating assembly provided by the embodiment of the present disclosure.

Moreover, in some embodiments, as shown in FIG. 1 and FIG. 4, the projection assembly may also include a rotary regulating assembly 90. The rotary regulating assembly 90 includes a mounting shell 91 and a movable connecting piece 92. The mounting shell 91 is provided with an accommodating cavity, a first end of the movable connecting piece 92 is disposed in the accommodating cavity and is movable in the accommodating cavity, a second end of the movable connecting piece 92 is connected with the housing 10, and the movable connecting piece 92 is configured for adjusting an angle of the housing 10 relative to the rotary regulating assembly 90. The first end is opposite to the second end.

Since the first end of the movable connecting piece 92 is disposed in the accommodating cavity of the mounting shell 91 and can move in the accommodating cavity, the second end of the movable connecting piece 92 is connected with the housing 10, when it is necessary to adjust the angle of the housing 10 relative to the rotary regulating assembly 90, an external force may be applied to the housing 10, so that the housing 10 drives the second end of the movable connecting piece 92 to move, and thus the first end of the movable connecting piece 92 can rotate in the accommodating cavity, thereby changing the angle of the housing 10 relative to the rotary regulating assembly 90, and thus changing an angle of the display module 30 relative to the rotary regulating assembly 90 in the housing 10.

It should be noted that, in the embodiment of the present disclosure, the first end of the movable connecting piece 92 may be of a spherical shape, and the second end of the movable connecting piece 92 may be rod-shaped. In this case, the first end of the spherical shape can rotate in the accommodating cavity of the mounting shell 91. That is, when it is necessary to adjust the angle of the housing 10 relative to the rotary regulating assembly 90, the housing may be rotated to drive the second end of the movable connecting piece 92 to move, thereby enabling the first end of the spherical shape to rotate in the accommodating cavity, and the angle of the housing 10 relative to the rotary regulating assembly 90 to change. In addition, with the first end of the movable connecting piece 92 being of the spherical shape, when the first end of the spherical shape rotates in the accommodating cavity, the movable connecting piece 92 may have three degrees of freedom, and thus the housing 10 has three degrees of freedom relative to the rotary regulating assembly 90.

In addition, in the embodiment of the present disclosure, when the projection assembly is applied to the vehicle and in order to avoid a problem that a joint between the second end of the movable connecting piece 92 and the housing 10 is loosened due to vibration of the vehicle when the vehicle is running, adhesive 001 may be provided at the joint between the second end of the movable connecting piece 92 and the housing 10, so that a gap at the joint between the second end of the movable connecting piece 92 and the housing 10 can be blocked.

Moreover, in the embodiment of the present disclosure, the housing 10 may be provided with a threaded hole and the second end of the movable connecting piece 92 may be provided with threads, so that the movable connecting piece 92 can be inserted into the threaded hole, enabling connection between the movable connecting piece 92 and the housing 10.

Moreover, in some embodiments, as shown in FIG. 4, the mounting shell 91 may also be provided with a fastening adjusting piece 93. In the case that the angle of the housing 10 relative to the rotary regulating assembly 90 is enabled, the fastening adjusting piece 93 abuts against the first end of the movable connecting piece 92 to fix the position of the first end of the movable connecting piece 92 in the accommodating cavity.

In a case that the fastening adjusting piece is disposed on the mounting shell 91, when the angle of the housing 10 relative to the rotary regulating assembly 90 needs to be adjusted, the housing 10 is caused to drive the movable connecting piece 92 to move, that is, to make the first end of the movable connecting piece 92 rotate in the accommodating cavity, and when the angle of the housing 10 relative to the rotary regulating assembly 90 is enabled, the first end of the movable connecting piece 92 can be caused not to rotate in the accommodating cavity by abutting the fastening adjusting piece 93 against the first end of the movable connecting piece 92, so that the position of the movable connecting piece 92 in the accommodating cavity, and thus the angle of the housing 10 relative to the rotary regulating assembly 90, is fixed. That is, with the fastening adjusting piece 93 being provided, the position of the housing 10 can be fixed when the angle of the housing 10 relative to the rotation adjustment assembly 90 is enabled.

It should be noted that, in the embodiment of the present disclosure, the fastening adjusting piece 93 may be a fastening screw, and when the housing 10 is rotated to enable the angle between the housing 10 and the rotary regulating assembly 90, the fastening screw may be rotated, such that the fastening screw abuts against the first end of the movable connecting piece 92 to cause the first end of the movable connecting piece 92 and the accommodating cavity of the mounting shell 91 not to rotate relatively; and the position of the movable connecting piece 92, and thus the position of the housing 10, is fixed. In other words, the angle between the housing 10 and the rotary regulating assembly 90 does not change any longer. When it is necessary to readjust the angle between the housing 10 and the rotary regulating assembly 90, the fastening screw may be rotated again to make the fastening screw no longer abut against the first end of the movable connecting piece 92 to enable the first end of the movable connecting piece 92 to rotate relative to the accommodating cavity of the mounting shell 91, thereby adjusting the angle of the housing 10 relative to the rotary regulating assembly 90. It should be noted that adjusting the angle of the housing 10 relative to the rotary regulating assembly 90 is essentially to adjust an angle of the display module 30 relative to the rotary regulating assembly 90.

Figure 5:
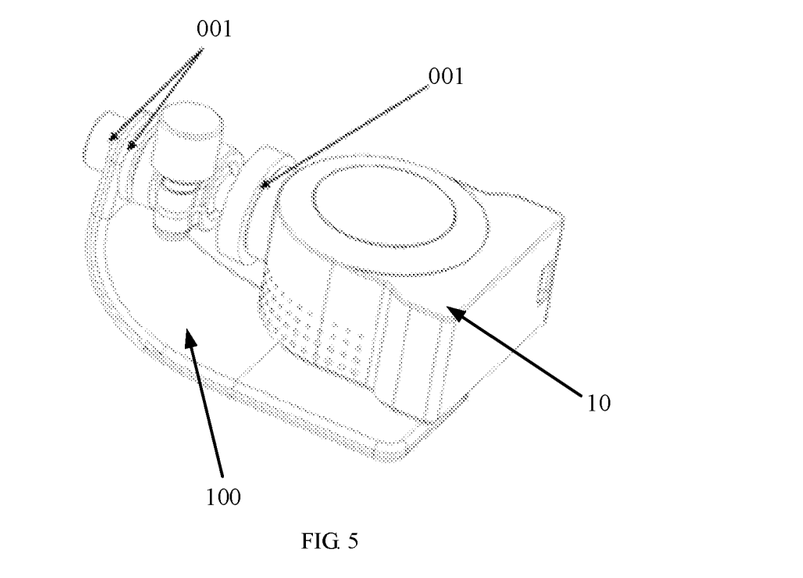
FIG. 5 shows still another imaging schematic diagram of a projection assembly provided by the embodiment of the present disclosure.

Moreover, in some embodiments, as shown in FIG. 4 and FIG. 5, the projection assembly may further include a mounting bracket 100, the mounting shell 91 may include a movable part 911 and a connecting part 912, and the movable part 911 is connected with the connecting part 912. The accommodating cavity is disposed in the movable part 911, the mounting bracket 100 is detachably connected with the connecting part 912, and the mounting bracket 100 is configured for mounting the mounting shell 91 to the vehicle.

Since the mounting bracket 100 is detachably connected with the connecting part 912 of the mounting shell 91, when the mounting shell 91 needs to be replaced, the mounting shell 91 may be detached from the mounting bracket to replace the mounting shell 91, and then the replaced mounting shell 91 may be connected to the mounting bracket 100. In addition, the mounting bracket 100 may be fixed in the vehicle, so that the projection assembly can be mounted in the vehicle by mounting the mounting shell 91 to the vehicle with the mounting bracket 100.

It should be noted that, in the embodiment of the present disclosure, the mounting bracket 100 may be connected with the connecting part 912 of the mounting shell 91 by a bolt, that is, the movable part 911 is provided with a threaded hole, the mounting bracket 100 is provided with a through hole, and the mounting bracket 100 is connected with the mounting shell 91 by passing the bolt through the through hole and inserting the bolt into the threaded hole on the movable part 911.

In addition, when the mounting shell 91 is mounted to the vehicle with the mounting bracket 100 and in order to avoid a problem that the joint between the mounting bracket 100 and the mounting shell 91 is loosened due to the vibration of the vehicle during traveling of the vehicle, the adhesive 001 may be provided at the joint between the mounting bracket 100 and the housing 10 of the mounting shell 91, and the gap between the mounting bracket 100 and the housing 10 of the mounting shell 91 can be blocked by the adhesive 001, thus avoiding the problem that the joint between the mounting bracket 100 and the mounting shell 91 is loosened due to the vibration of the vehicle. In addition, in a case that the mounting bracket 100 and the mounting shell 91 are connected by the bolt, the adhesive 001 is provided at the gap between the mounting bracket 100 and the mounting shell 91. The adhesive 001 can not only block the gap between the mounting bracket 100 and the mounting shell 91, but also be bonded to the bolt, such that the mounting bracket 100 and the mounting shell 91 are connected more firmly.

Moreover, in some embodiments, as shown in FIG. 1, the projection assembly may also include a restrained support 110. The restrained support 110 has a plate structure, and the restrained support 110 includes a first surface and a second surface which are opposite to each other; an end of the mounting bracket 100 is connected with the first surface, the second surface is provided with a bonding piece configured for bonding the restrained support 110 in the vehicle.

In a case that the projection assembly includes the restrained support 110, the end of the mounting bracket 100 is connected with the first surface of the restrained support 110, and the second surface of the mounting bracket 100 is provided with the bonding piece, when it is necessary to connect the restrained support 110 to the vehicle so as to mount the projection assembly in the vehicle, the second surface of the restrained support 110 can be directly bonded to a position in the vehicle where mounting is to be made, so that the projection assembly can be installed in the vehicle, with easy mounting of the projection assembly in the vehicle.

Figure 6:
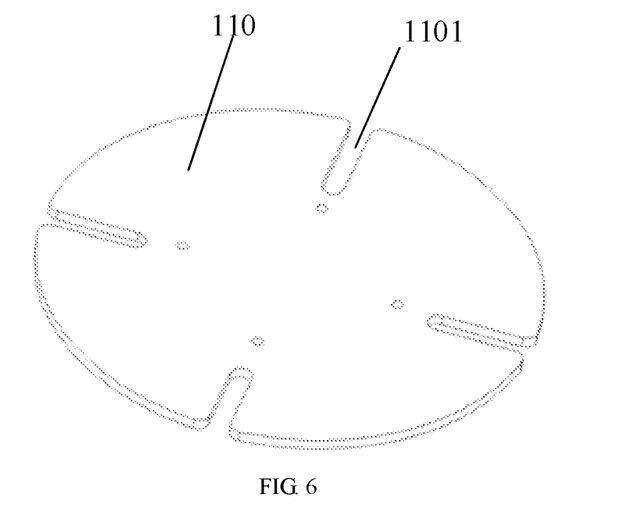
FIG. 6 shows a schematic diagram of a restrained support provided by an embodiment of the present disclosure.
Figure 7:
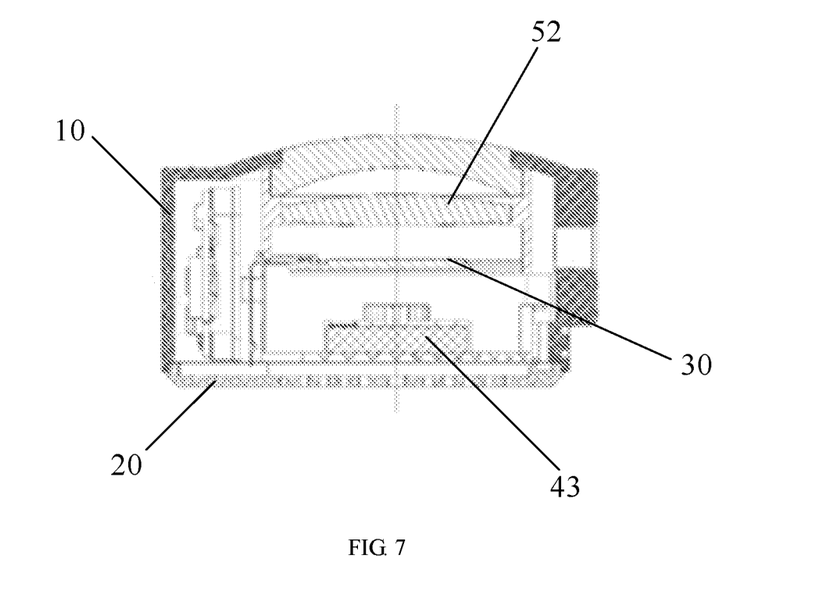
FIG. 7 shows a sectional view of a projection assembly provided by the embodiment of the present disclosure.
Figure 8:
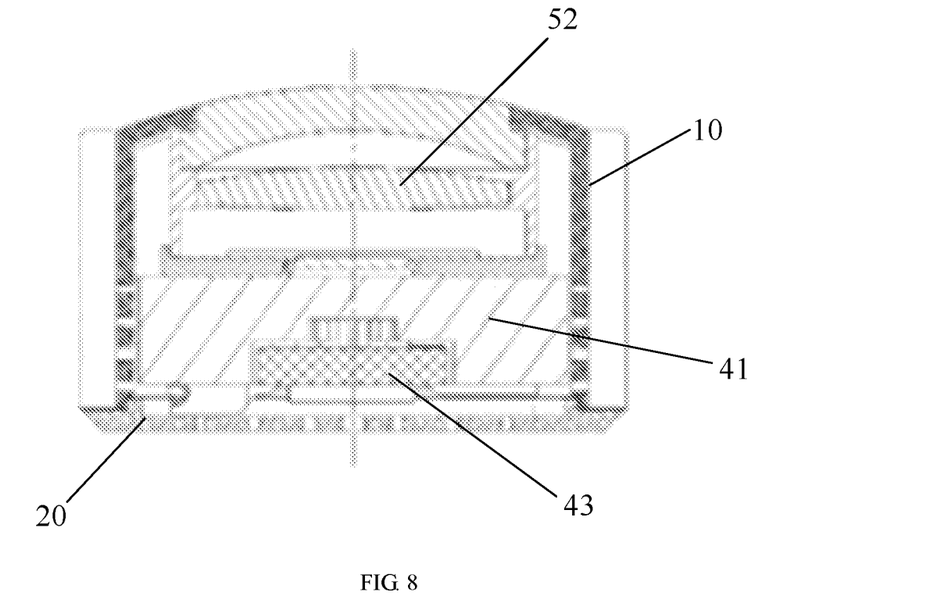
FIG. 8 shows another sectional view of a projection assembly provided by the embodiment of the present disclosure.
Figure 9:
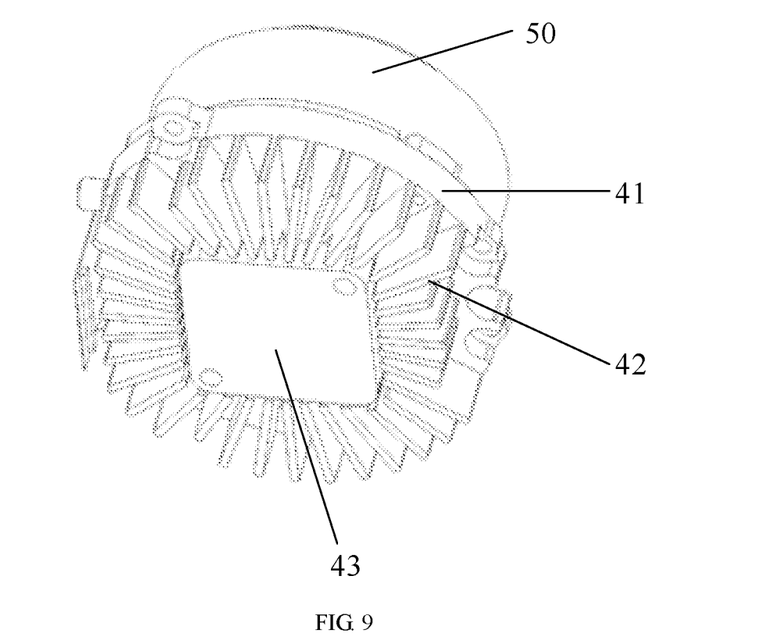
FIG. 9 shows a schematic diagram of a heat dissipation assembly provided by the embodiment of the present disclosure.

It should be noted that the restrained support 110 may be provided with a cutout 1101, so that the restrained support 110 can adapt to mounting positions for different vehicles. When the projection assembly is mounted in the vehicle, the projection assembly is usually mounted at a center console of the vehicle. That is, with the cutout 1101 being provided on the restrained support 110, the restrained support 110 can adapt to center consoles of different vehicles, with versatility of the projection assembly. In addition, both a shape and a number of the cutout 1101 may be set according to actual needs, which are not limited here in the embodiment of the present disclosure.

Moreover, in the embodiment of the present disclosure, the mounting bracket 100 may be connected with the restrained support 100 by bolts, or certainly, may also be connected in other ways, such as snap connection, which is not limited here in the embodiment of the present disclosure.

In the embodiment of the present disclosure, as the housing 10 is connected with the bottom cover 20, and the housing 10 and the bottom cover 20 form the accommodating space, the heat dissipation assembly 40, the display module 30 and the imaging lens 50 may be disposed in the accommodating space. Because the display module 30 is disposed on the heat dissipation assembly 40, and the imaging lens 50 includes the lens barrel 51 and the lens assembly 52, with lens barrel 51 being disposed on the heat dissipation assembly 40, the lens being disposed in the lens barrel 51, the lens barrel 51 surrounding the display module 30, and the display module 30 facing the lens assembly 52, light emitted by the display module 30 can pass through and image through the lens assembly 52 and heat dissipated by the display module can be dissipated through the heat dissipation assembly 40, when the display module 30 displays an image. As the housing 10 is provided with the opening and the lens assembly 52 faces the opening, when the lens assembly 52 is imaging, the light emitted by the display module can pass through the lens assembly 52 and then penetrates out from the opening of the housing 10, so that the lens assembly 52 can image outside the housing 10; and when the projection assembly is applied to a vehicle, the light emitted by the display module 30 passes through the lens assembly 52 and then can display on a to-be-displayed device in the vehicle, so that a driver can see the image displayed by the display module 30 on the to-be-displayed device. That is, in the embodiments of the present disclosure, by arranging the heat dissipation assembly 40, the display module 30 and the imaging lens 50 in the accommodating space formed by the housing 10 and the bottom cover 20, when the display module 30 displays an image, the image can be displayed through the imaging lens 50, and then transmitted to outside of the housing 10 through the opening in the housing 10; moreover, heat dissipation can be made by the heat dissipation assembly 40 on the projection module 30, so that heat generated by the projection assembly can be dissipated by the heat dissipation assembly 40 during an imaging and projection process of the projection assembly, with a better projection effect of the projection assembly.

Figure 11:
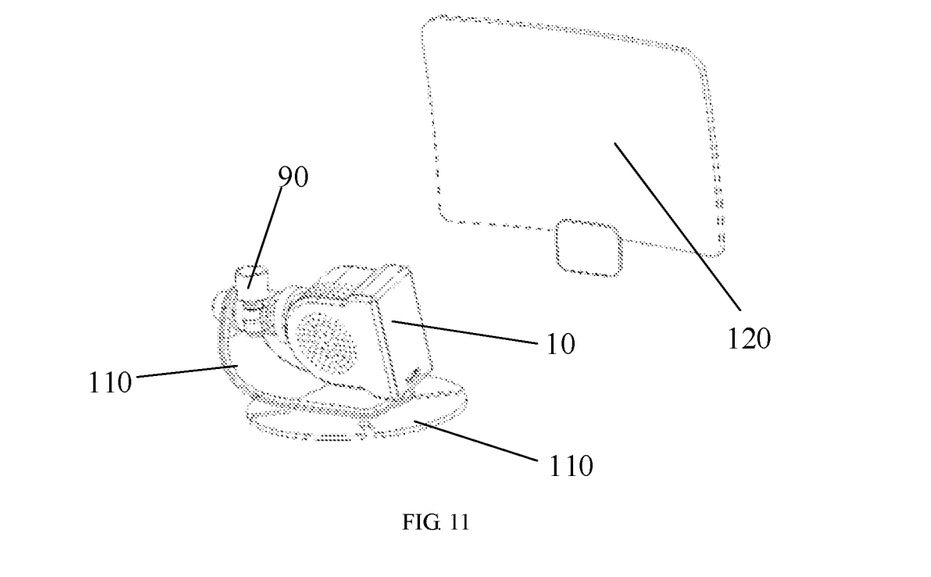
FIG. 11 shows a schematic diagram of a display system provided by an embodiment of the present disclosure.

A display system is provided in an embodiment of the present disclosure. As shown in FIG. 11, the display system includes a display screen 120 and any one of the projection assemblies described in the foregoing embodiments. The lens assembly 52 faces the display screen 120.

As the lens assembly 52 faces the display screen 120, when the display module 30 in the projection assembly displays an image, that is, the display module 30 emits light, the light can be image through the lens assembly 52 and finally the image on the display module 30 is displayed on the display screen 120.

A vehicle is provided in an embodiment of the present disclosure. The vehicle includes the display system in the foregoing embodiment.

It should be noted that each of the embodiments in this specification is described in a progressive way, each of the embodiments focuses on differences from other embodiments, and the same and similar parts among the embodiments may be referred to each other.

Although the optional embodiments of the embodiments of the present disclosure have been described, those skilled in the art can make additional changes and modifications to these embodiments with knowledge of basic inventive concepts. Therefore, the appended claims are intended to be interpreted as including optional embodiments and all of the changes and modifications that fall within the scope of the embodiments of the present disclosure.

Finally, it should also be noted that relational terms herein such as first and second, etc., are used merely to distinguish one entity or operation from another, and do not necessarily require or imply there is any such relationship or order between these entities or operations. Furthermore, terms "including", "comprising" or any of variations thereof are intended to encompass a non-exclusive inclusion, such that an article or a terminal device including a plurality of elements includes not only those elements but also includes other elements not expressly listed, or also includes elements inherent to such article or terminal device. In absence of further limitation, an element defined by a phrase "including a . . . " does not exclude presence of additional identical element in the article or the terminal device including the element.

The technical solutions provided by the present disclosure are introduced in detail above. Specific examples are used herein to explain the principle and implementations of the present disclosure. Meanwhile, those skilled in the art may make some changes in a specific implementation and application scope according to the principle and implementations of the present disclosure. To sum up, content of this specification should not be construed as limitation of the present disclosure.

The invention claimed is:

1. A projection assembly applied to a vehicle, comprising: a housing, a bottom cover, a display module, a heat dissipation assembly and an imaging lens; wherein
   the housing is connected with the bottom cover, and the housing and the bottom cover form an accommodating space, the heat dissipation assembly, the display module and the imaging lens are all disposed in the accommodating space, and the display module is disposed on the heat dissipation assembly; and
   the imaging lens comprises a lens barrel and a lens assembly, the lens barrel being disposed on the heat dissipation assembly, the lens assembly being disposed in the lens barrel, and the lens barrel surrounding the display module, the display module facing the lens assembly, the housing being provided with an opening, and the lens assembly facing the opening.

2. The projection assembly according to claim 1, wherein the bottom cover is provided with a plurality of first air holes, and the heat dissipation assembly comprises a heat conducting block and a plurality of heat dissipation fins; and
   the heat conducting block comprises a first face and a second face which are opposite to each other, the second face facing the plurality of first air holes on the bottom cover, the display module being disposed on the first face, and the plurality of heat dissipation fins being disposed on the second face.

3. The projection assembly according to claim 2, wherein the heat dissipation assembly further comprises a heat dissipation fan, the housing is provided with a plurality of second air holes, and the plurality of second air holes all face the heat dissipation fins; and
   the heat dissipation fan is disposed on the second face, the plurality of heat dissipation fins surround the heat dissipation fan, and the heat dissipation fan faces the bottom cover, so that an air flow generated by the heat dissipation fan circulates through the first air holes or the second air holes.

4. The projection assembly according to claim 1, wherein the projection assembly further comprises a control circuit; and the control circuit is disposed in the accommodating space, and the display module is electrically connected with the control circuit, and the control circuit is configured for controlling the display module to display.

5. The projection assembly according to claim 4, wherein the projection assembly further comprises a fixing member; and the fixing piece is disposed in the accommodating space, the control circuit is connected with the fixing piece, and the fixing piece is configured for fixing the control circuit.

6. The projection assembly according to claim 4, wherein the projection assembly further comprises an interface assembly; and the housing is provided with a through hole, the interface assembly is partially located in the accommodating space, and the interface assembly is partially located in the through hole, and the interface assembly is electrically connected with the control circuit.

7. The projection assembly according to claim 1, wherein the projection assembly further comprises a rotary regulating assembly;

the rotary regulating assembly comprises a mounting shell and a movable connecting piece; and the mounting shell is provided with an accommodating cavity, a first end of the movable connecting piece is disposed in the accommodating cavity and is movable in the accommodating cavity, a second end of the movable connecting piece is connected with the housing, and the movable connecting piece is configured for adjusting an angle of the housing relative to the rotary regulating assembly;

wherein, the first end is opposite to the second end.

8. The projection assembly according to claim 7, wherein the mounting shell is provided with a fastening adjusting piece; and in a case that the angle of the housing relative to the rotary regulating assembly is enabled, the fastening adjusting piece abuts against the first end of the movable connecting piece, so that a position of the first end of the movable connecting piece in the accommodating cavity is fixed.

9. The projection assembly according to claim 7, wherein the projection assembly further comprises a mounting bracket, the mounting shell comprises a movable part and a connecting part, the movable part being connected with the connecting part; and the accommodating cavity is disposed in the movable part, the mounting bracket is detachably connected with the connecting part, and the mounting bracket is configured for mounting the mounting shell on the vehicle.

10. The projection assembly according to claim 9, wherein the projection assembly further comprises a restrained support; and the restrained support has a plate structure, and the restrained support comprises a first surface and a second surface which are opposite to each other; an end of the mounting bracket is connected with the first surface, the second surface is provided with a bonding piece, and the bonding piece is configured for bonding the restrained support in the vehicle.

11. A display system, comprising a display screen and the projection assembly, the projection assembly applied to a vehicle, comprising: a housing, a bottom cover, a display module, a heat dissipation assembly and an imaging lens; wherein the housing is connected with the bottom cover, and the housing and the bottom cover form an accommodating space, the heat dissipation assembly, the display module and the imaging lens are all disposed in the accommodating space, and the display module is disposed on the heat dissipation assembly; and the imaging lens comprises a lens barrel and a lens assembly, the lens barrel being disposed on the heat dissipation assembly, the lens assembly being disposed in the lens barrel, and the lens barrel surrounding the display module, the display module facing the lens assembly, the housing being provided with an opening, and the lens assembly facing the opening; and the lens assembly faces the display screen.

12. A vehicle, comprising the display system according to claim 11.

13. The display system according to claim 11, wherein the bottom cover is provided with a plurality of first air holes, and the heat dissipation assembly comprises a heat conducting block and a plurality of heat dissipation fins; and the heat conducting block comprises a first face and a second face which are opposite to each other, the second face facing the plurality of first air holes on the bottom cover, the display module being disposed on the first face, and the plurality of heat dissipation fins being disposed on the second face.

14. The display system according to claim 11, wherein the projection assembly further comprises a control circuit; and the control circuit is disposed in the accommodating space, and the display module is electrically connected with the control circuit, and the control circuit is configured for controlling the display module to display.

15. The display system according to claim 11, wherein the projection assembly further comprises a rotary regulating assembly;

the rotary regulating assembly comprises a mounting shell and a movable connecting piece; and the mounting shell is provided with an accommodating cavity, a first end of the movable connecting piece is disposed in the accommodating cavity and is movable in the accommodating cavity, a second end of the movable connecting piece is connected with the housing, and the movable connecting piece is configured for adjusting an angle of the housing relative to the rotary regulating assembly;

wherein, the first end is opposite to the second end.

16. The display system according to claim 13, wherein the heat dissipation assembly further comprises a heat dissipation fan, the housing is provided with a plurality of second air holes, and the plurality of second air holes all face the heat dissipation fins; and the heat dissipation fan is disposed on the second face, the plurality of heat dissipation fins surround the heat dissipation fan, and the heat dissipation fan faces the bottom cover, so that an air flow generated by the heat dissipation fan circulates through the first air holes or the second air holes.

17. The display system according to claim 14, wherein the projection assembly further comprises a fixing member; and the fixing piece is disposed in the accommodating space, the control circuit is connected with the fixing piece, and the fixing piece is configured for fixing the control circuit.

18. The display system according to claim 14, wherein the projection assembly further comprises an interface assembly; and the housing is provided with a through hole, the interface assembly is partially located in the accommodating space, and the interface assembly is partially located in the through hole, and the interface assembly is electrically connected with the control circuit.

19. The display system according to claim 15, wherein the mounting shell is provided with a fastening adjusting piece; and in a case that the angle of the housing relative to the rotary regulating assembly is enabled, the fastening adjusting piece abuts against the first end of the movable connecting piece, so that a position of the first end of the movable connecting piece in the accommodating cavity is fixed.

20. The display system according to claim 15, wherein the projection assembly further comprises a mounting bracket, the mounting shell comprises a movable part and a connecting part, the movable part being connected with the connecting part; and the accommodating cavity is disposed in the movable part, the mounting bracket is detachably connected with the connecting part, and the mounting bracket is configured for mounting the mounting shell on the vehicle.

\* \* \* \* \*